United States Patent Office 3,660,554
Patented May 2, 1972

3,660,554
PROCESS FOR THE PREPARATION OF SHAPED MATERIALS OF AMIDOVINYL COMPOUND-GRAFTED AROMATIC POLYESTERS
Takayuki Okamura, Kurashiki, Japan, assignor to Kurashiki Rayon Co., Ltd., Kurashiki, Japan
No Drawing. Filed July 15, 1969, Ser. No. 841,979
Claims priority, application Japan, July 17, 1968, 43/50,331
Int. Cl. D01f 7/06; B29c 25/00
U.S. Cl. 264—78          7 Claims

ABSTRACT OF THE DISCLOSURE

A process for the preparation of an amidovinyl compound-grafted shaped material of aromatic polyester, which comprises heating a shaped material of aromatic polyester at a temperature of 60–150° C., while keeping it in contact with a solvent containing at least one amidovinyl compound, the solvent being such that the solubility of the amidovinyl compound therein is 0.1–50 g. per 100 cc. at 45° C., and the degree of swelling of the shaped material with the solvent is 0.5–20% at 60° C.

---

This invention relates to a process for the preparation of shaped materials, particularly fibers and films, of aromatic polyesters grafted with amidovinyl compounds, which exhibit excellent properties.

Aromatic polyester fibers, for example, polyethylene terephthalate fibers, possess excellent fiber properties such as high tenacity, thermal stability, dimensional stability, light fastness, crease resistance, etc. However, they concurrently show numbers of drawbacks such as low dyeability and moisture absorption, easy accumulation of static charge, inferior soil resistance and poor adhesiveness with rubber and other plastics. Various attempts for improving those defects were made, but an improvement satisfactory in all aspects has not yet been discovered, since some of such attempts result in serious loss of desirable fiber properties, and some lack permanent improving effect.

Whereas, it is now found that, upon graft-polymerizing a shaped material of aromatic polyesters with at least an amidvinyl compound by heating the shaped material while contacting it with a specific solvent containing the amidovinyl compound, a shaped aromatic polyester material improved of the foregoing deficiencies is obtained. Such a product furthermore substantially retains the inherent, desirable properties. Such specific solvent will be fully explained later. The graft-polymerization performed in accordance with the present invention requires no addition of catalyst. Nevertheless, the graft-polymerization reaction progresses with high degree of grafting and high grafting efficiency. Incidentally, the terms, "degree of grafting" and "grafting efficiency" used in this specification are the values defined by the equations below:

Degree of grafting (percent)

$$= \frac{\begin{bmatrix}\text{Weight of grafted}\\\text{shaped material}\end{bmatrix} - \begin{bmatrix}\text{Weight of starting}\\\text{shaped material}\end{bmatrix}}{[\text{Weight of starting shaped material}]} \times 100$$

Grafting efficiency (percent)

$$= \frac{\text{Weight of graft-polymerized monomer}}{\text{Total weight of polymerized monomer}} \times 100$$

The "weight of grafted shaped material" is measured as follows: the shaped material obtained through the graft-polymerization procedure is immersed in water at temperatures ranging from ambient temperature to 60° C., and the system is stirred for 24 hours. Whereby the homopolymer of amidovinyl compound is dissolved and removed by filtration. The remaining shaped material is dried and its weight is measured.

Conventionally, irradiation of ionizing radiation or presence of a catalyst such as benzoyl peroxide, potassium persulfate, cerium salt, and the like, is considered to be essential for grafting of vinyl monomer to the shaped material. For example, British Pat. No. 894,395 discloses subjecting shaped polyesters to high energy ionizing radiation while contacting them with an aqueous solution of amidovinyl compound, in order to graft the amidovinyl compound to shaped polymer. However, such irradiation tends to cause scission of main chains of the polymer due to the high energy of radiation, and consequently invites deterioration in mechanical properties of the shaped materials. Furthermore, there is a considerable probability that the shaped materials are objectionably colored by the chemical reaction induced by the irradiation. Also when a catalyst is employed, addition of a polymerization inhibitor and removal of the catalyst after the polymerization procedure are required. Still the trace of remaining catalyst in the shaped materials impossible of elimination may cause discoloration of the products. In clear contrast thereto, according to the present invention irradiation with ionizing radiation or addition of catalyst is unnecessary, and thus the subject process is completely free from the foregoing drawbacks.

Accordingly, the main object of the invention is to provide a process for the preparation of shaped materials of grafted aromatic polyesters of excellent properties, by graft-polymerizing at least an amidovinyl compound onto a shaped material of aromatic polyester with a high degree of grafting and high grafting efficiency, without using ionizing radiation or catalyst. Other objects and advantages of the invention will become apparent from the following descriptions.

The process for the preparation of shaped materials of amidovinyl compound-grafted aromatic polyesters in accordance with the present invention comprises heating a shaped material of aromatic polyester at a temperature of 60–150° C., while keeping it in contact with a solvent containing at least one amidovinyl compound, the solvent being so selected that the solubility of the amidovinyl compound therein is 0.1–50 g. per 100 cc. at 45° C., and the degree of swelling of the shaped material therewith is 0.5–20% at 60° C.

In the above, "degree of swelling" is the ratio of amount of the solvent absorption to the weight of shaped material measured when the shaped material is swollen with the solvent to the point of swelling equilibrium, expressed in percentile value. Any solvent which fails to meet the requirements on the solubility and/or degree of swelling never gives a final product satisfying the objects of this invention. The optimum solubility ranges from 0.3 to 30 g./100 cc., and the optimum degree of swelling ranges from 3 to 15% at the specified temperatures.

Specific examples of such solvents satisfying both requirements of the solubility and degree of swelling including benzene, toluene, tetrahydronaphthalene, ethyl acetate, n-heptane, n-hexane, and n-octane. It is also possible to mix plural solvents to form a mixed solvent suitable for use or a mixed solvent in which the two requirements of the degree of swelling and solubility are within particularly preferred ranges. For instance, by mixing a solvent which meets the requirements of solubility and degree of swelling but whose solubility is near the lower limit, such as n-heptane, with a solvent whose degree of swelling is near the upper limit, such as tetrachloroethane, at a suitable mixing ratio there can be formed a mixed solvent in which the two requirements are within preferred ranges. Still further, it is also possible to mix a solvent which does not meet either of the two requirements, such as water, with other suitable solvent, to thereby form a solvent suitable for use. Several examples of such mixed solvents may be named as follows: n-heptane-tetrachloroethane, n-hexane-tetrachloroethane, benzene-tetrachloroethane, toluene-tetrachloroethane, xylene-tetrachloroethane, benzene-dioxane, water-dioxane, methanol-chloroform, etc. Whether or not a solvent meets the two requirements can be easily determined by a simple preliminary test. Among the above-named solvents, benzene and toluene are most preferred.

For referential purpose solubility of amidovinyl compound in various solvents, and degree of swelling of the shaped material with the solvents were measured under the below-specified conditions. The results are given in the table below, together with the resulting degree of grafting and grafting efficiency in the graft-polymerization conducted using the solvent. The shaped aromatic polyester employed in the experiments was each 0.1 g. of polyethylene terephthalate fiber of 1.43 deniers having a dry tenacity of 5.2 g./dr., and the amidovinyl compound employed was acrylamide. The sample fiber was immersed in 100 cc. of the solvent saturated with acrylamide at 60° C. for 2 hours, withdrawn, and with the liquid pick-up of 1 cc. heated at 90° C. for 4 hours.

| Solvent (cc.) | Solubility at 45° C. (g./100 cc.) | Degree of swelling at 60° C. (percent) | Degree of grafting (percent) | Grafting efficiency (percent) |
|---|---|---|---|---|
| Benzene (100) | 1.5 | 5 | 34 | 95 |
| Benzene (90) plus tetrachloroethane (10) | 2 | 7 | 28 | 90 |
| Toluene (100) | 1.3 | 6 | 20 | 87 |
| Toluene (90) plus tetrachloroethane (10) | 1.7 | 8 | 17 | 85 |
| n-Heptane (80) plus tetrachloroethane (20) | 7 | 9 | 9 | 75 |
| n-Heptane (70) plus tetrachloroethane (30) | 40 | 12 | 8 | 70 |
| n-Heptane (50 plus tetrachloroethane (50) | 60 | 15 | 0.2 | 30 |
| Tetrachloroethane (100) | >100 | 17 | 2 | 7 |
| Ethanol (75) plus formic acid (25) | >100 | 3 | 1 | 5 |
| Water (100) | >100 | 0.1 | 0 | 0 |

As clearly demonstrated by the above results, solvents showing both the solubility and degree of swelling within the specified ranges of this invention invariably give high degree of grafting and grafting efficiency. However, all the solvents failing to meet either one or both requirements give only poor degree of grafting and low grafting efficiency. Furthermore, it can be understood that the degree of grafting and grafting efficiencies obtained when the specified solvents are used are unexpectedly high. That is, it can be immediately understood from due calculation that, if the acrylamide concentration in the acrylamide solution absorbed into the sample fiber and that in the solution picked up on the surfaces of said sample fiber is identical with the acrylamide concentration in the bath preceding the immersion of sample fiber, such high degree of grafting and grafting efficiencies as given in the above table would not be obtained. Such surprisingly high degree of grafting and grafting efficiencies are achieved, probably due to the phenomenon that, based on the unique properties of the specified solvents, acrylamide concentration in the solution absorbed into the sample fiber and picked up on the surfaces of same fiber is higher than that in the solution in the bath. In fact it is confirmed that after immersion and withdrawal of the fiber, the acrylamide concentration in the bath is reduced from that prior to the fiber immersion. In contrast thereto, such valuable and unexpected effect cannot be obtained with the use of any solvent failing to meet one or both of the requirements specified in this invention.

The aromatic polyesters forming the starting shaped materials to be employed in the invention include high molecular polyesters obtained by polycondensation of $\alpha,\omega$-glycol and aromatic dicarboxylic acid or a lower alkyl ester thereof as the main reactants; polyesters in which a minor amount of a third component, such as p-hydroxybenzoic acid, pentaerythritol or the like, is simultaneously condensed; and certain other polymers described below. Said "certain polymers" mean the polyesters obtained by, in the preparation of a first-mentioned high molecular aromatic polyester, co-condensing with the main components a minor amount of a compound containing at least one non-aromatic carbon to carbon double bond and another non-aromatic carbon to carbon double bond conjugated with the first bond, i.e., —C=C—C=C—, and also at least one of carboxylic acid ester linkage-forming radical, such as dimethyl-muconic acid; or a compound containing at least one of non-aromatic carbon to carbon double bond and carbon to oxygen double bond conjugated therewith, i.e., —C=C—C=O, and at least one of carboxylic acid ester linkage-forming radical, such as itaconic acid.

The term "shaped materials," is used to signify fiber, film, and the like.

The fibers may be optionally heat treated or crimped before they are subjected to the present process. They may take any form such as staple fiber, filament, tow, yarn, woven fabric, and the like.

The amidovinyl compounds to be grafted are aliphatically unsaturated compounds containing an amide group, which are expressed by a general formula,

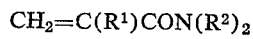

$$CH_2=C(R^1)CON(R^2)_2$$

in which $R^1$ stands for hydrogen or an alkyl group containing no more than two carbons, and $R^2$ stands for hydrogen, an alkyl group containing no more than four carbons, methylol group, cyanoethyl group, or acetyl group.

Specific examples include acrylamide, methacrylamide, N-isopropylacrylamide, N-t-butylacrylamide, N-methylacrylamide, and N-methylolacrylamide.

Those amidovinyl compounds can be used each by itself or as mixtures, or may be mixed with other polymerizable monomer or monomers. "Other polymerizable monomers" means radical-polymerizable monomers including methyl methacrylate, acrylonitrile, methacrylonitrile, and acrylic acid.

The concentration of amidovinyl compound in the specified solvent solution in which a shaped material is to be immersed is not critical, but it is normally desirable that the concentration should be at least 0.1 g./100 cc. At the concentrations below said level, the absolute quantity of the amidovinyl compound to be absorbed into the shaped material and picked up onto the surfaces thereof is too little to produce satisfactorily grafted product. Suitable concentration is determined in each instance, depending on the desired degree of grafting. Normally saturated concentration is employed, but higher amidovinyl compound contents are also allowable. That is, since the amidovinyl compound in the specified solvent is selectively absorbed into the shaped material of aromatic polyester and also picked up onto the surfaces thereof as already mentioned, more than saturated amount of amidovinyl compound may be contained in the bath of specified solvent. In that case not all of the amidovinyl compound is dissolved, but the surplus compound forms a suspension system together with the solvent.

It has been discovered that the heating temperature of the shaped material to effect the object graft-polymerization suitably ranges from 60° to 150° C. At below 60° C. the graft-polymerization hardly progresses. Whereas, at the temperatures higher than 150° C., objectionable side reaction such as crosslinkage of grafted amidovinyl compound chains may take place, and furthermore the physical properties of the product tend to be degraded. Particularly preferred temperature range is 70°–120° C.

The time required for the graft polymerization may be optionally selected within a range of from several minutes to ten and several hours depending on the desired degree of grafting, but generally, it is sufficient to conduct the graft polymerization for 30 minutes to 5 hours. As the graft polymerization is high, so the polymerization time is short.

Hereinafter some of the embodiments of subject process will be explained.

One embodiment of the present invention comprises immersing a shaped material of aromatic polyester in a bath of the specified solvent containing at least one amidovinyl compound, which is maintained at 5°–60° C., whereby swelling the former with the solvent, withdrawing the swollen material from the bath, and heating the material at 60°–150° C. while 1–20 cc. of the solvent containing the amidovinyl compound per 1 g. of the shaped material is still retained in said material.

The temperature of the bath in which the shaped material is to be immersed is suitably selected from the above-specified range. Higher side temperatures within said range, i.e., those close to 60° C., are useful for increasing the swelling speed of shaped material. However, when it exceeds 60° C., objectionable polymerization of amidovinyl compound simultaneously takes place. Generally speaking, it is desirable to keep the shaped material immersed in the bath until it is completely swollen, i.e., until the swelling equilibrium is reached. The time required therefor can be easily determined by a simple preliminary test. Normally it is one to several hours at 60° C. It is of course possible to practice the process without the complete swelling.

It is very effective for the preparation of high quality final product, to initiate graft-polymerization after withdrawal of the swollen material from the bath, while the material still retains 1–20 cc. of the solvent solution of the amide vinyl compound per 1 g. of the shaped material.

In another embodiment of the invention, the shaped material of aromatic polyester is immersed in a bath of the specified solvent containing at least one amidovinyl compound, and the system is heated at 60°–150° C. as it is. The volume of the bath employed is 20–2,000 cc. per 1 g. of the shaped material.

Normally high degree of grafting is obtained by using large volume of the bath, while high grafting efficiency is obtained by small volume of the bath. In consideration of the contradicting two factors, the bath volume suitable for the preparation of satisfactory product ranges, as aforesaid, 20–2,000 cc. per 1 g. of the shaped material, the optimum range 50–500 cc.

According to the invention and embodiments thereof as explained in the foregoing, the amidovinyl compound or compounds can be easily grafted to shaped materials of aromatic polyesters, with high degree of grafting ranging from 10% to several tens of percentages. Consequently the deficiencies inherent in the starting shaped materials of aromatic polyesters can be remarkably improved.

Taking the case of fiber, for example, the following improvements can be effected. The grafted aromatic polyester fibers obtained in accordance with the invention substantially retain the desirable properties of the starting polyester fibers, and exhibit moisture absorption close to that of natural fiber, as well as high resistances to accumulation of static charge and soiling. Furthermore, they show good color developing property and dye absorption when dyed with cation dyes. The dyed colors show high washing fastness. Particularly the polyesters, in which a minor amount of third component such as aforementioned muconic acid or itaconic acid is co-condensed, show remarkably improved light fastness of dyed colors. Thus the fibers obtained in accordance with the invention possess not only various valuable properties for clothing use, but also high adaptability to industrial fibers such as tyre cord. That is, while conventional polyester tyre cord requires an isocyanate treatment besides RFL treatment (treatment with resorcin-formalin latex) before its adhesion to rubber, the fibers prepared by the subject process exhibit strong adherability with rubber after an RFL treatment alone.

Hereinafter the invention will be explained with reference to working examples.

EXAMPLE 1

One (1) g. of polyester fiber in which the monofilament had a size of 1.3 deniers, dry strength of 7 g. and dry elongation of 35% which was obtained by melt-spinning, drawing, and heat-treating a polyester formed of polycondensation of ethylene glycol with terephthalic acid, was immersed in 100 cc. of saturated benzene solution of acrylamide at 60° C. for 2 hours. (The solubility of acrylamide in benzene is 1.5 g./100 cc. at 45° C., and degree of swelling of the fiber is 5% at 60° C.) Thus swollen fiber was withdrawn, lightly squeezed until the liquid infiltrated into the fiber was reduced to 3 cc./1 g. of the fiber, and heated at 80° C. for 3 hours in the atmosphere of nitrogen gas.

Thereafter the fiber was thrown into methanol to dissolve and eliminate the unreacted acrylamide monomer from the fiber. The fiber was dried, and thereafter acrylamide homopolymer was extracted therefrom with warm water of 50° C., for 24 hours. The fiber was then vacuum-dried overnight at 60° C. Thus an acrylamide-grafted polyester fiber at a degree of grafting of 16% was obtained, with a grafting efficiency of 90%. The moisture regain of this grafted fiber in the standard atmosphere (20° C., relative humidity of 65%) was 4.5%, and its water absorption was 30%. Since the moisture regain and water absorption of the starting fiber under identical conditions were 0.25% and 13%, respectively, the hydrophilic property of the resulting grafted fiber was remarkedly improved. The product's monofilament had a size of 1.7 deniers, dry strength of 6.8 g., and dry elongation of 37%.

EXAMPLE 2

A grafted fiber was prepared similarly to Example 1, except that the grafting reaction was performed for 4 hours at 90° C. The degree of grafting obtained was 34%, and the grafting efficiency, 95%.

The grafted fiber exhibited excellent dyeability when dyed with a cationic dye under the conditions given below. Whereas, the starting polyethylene terephthalate fiber showed hardly any dyeability under identical conditions. Thus it was confirmed that in the grafted fiber, dye affinity was drastically improved. The results are given in Table 1.

Dyeing conditions:
 Dyestuff: Deorlen Blue-5G:
  (C.I. Basic Blue-3) 5% (to the material to be dyed)
 Dispersing agent A:
  (composed mainly of sodium dodecylsulfate) 2.5% (to the material to be dyed)
 Dispersing agent B:
  (polyoxyalkylene alkyl ether) 5% (to the material to be dyed)
 Bath ratio: 50:1
 Bath temperature: 98° C.
 Dyeing time: 120 minutes
Soaping conditions:
 Dispersing agent B: 1 g./liter
 Bath ratio: 50:1
 Bath temperature: 60° C.
 Soaping time: 50 minutes

TABLE 1

| Item | Grafted fiber | Material fiber |
|---|---|---|
| Color shade [1] (K/S) | 14.1 | 1.7 |
| Washing fastness [2] (measured by degree of discoloration). | Class 4-5 | Class 3-4 |

[1] Color shade was calculated from Kubelka-Munks formula:

$$KS = \frac{(1-r)^2}{2r}$$

wherein $r$ is transmittance reflectance (percent) at a wave length of maximum absorption.

[2] Washing fastness was measured according to JIS L-1045-1959 MC-NO. 2 by the following procedures:

A dyed sample put between white cloths of vinylon (polyvinyl alcohol fiber) and Vonnel (registered trademark, product of Mitsubishi Rayon Co.) is treated with washing water containing pure soap (Marseille soap) according to the prescribed method. After washing and drying, discoloration of the sample and the white cloths are compared in tone with the standard color index to determine the grade.

EXAMPLE 3

Example 2 was repeated except that the benzene solvent was replaced by toluene, and 100 g. of starting fiber was used. The resulting degree of grafting was 20%, and grafting efficiency was 67%. This grafted fiber was knit into a tricot fabric, and its antistatic property was examined. The electrical resistance was $2 \times 10^3$ ohms at 100 volts. As to its electrification in electrostatic filed, the charge was 3 millivolts, and half value period was 1 second. The tricot knit from the starting polyethylene terephthalate fiber had an electrical resistance, static charge and half value period of, respectively, not less than $2 \times 10^{12}$ ohms, 57 millivolts and no less than 30 seconds. Thus the grafting drastically improved antistatic property of the fiber. Remarkable improving effect was also recognized as to soil resistance.

EXAMPLE 4

Example 1 was repeated except that acrylamide was replaced by N-methylolacrylamide. Thus a grafted fiber was obtained at a degree of grafting of 18% with a grafting efficiency of 87%.

EXAMPLE 5

Example 1 was repeated except that extra 2 cc. of methyl methacrylate was added to the 100 cc. of saturated benzene solution of acrylamide. Thus a grafted polyester fiber was obtained at a degree of grafting of 30%. It was confirmed through an infrared absorption spectrum analysis that both acrylamide and methyl methacrylate were grafted.

EXAMPLE 6

Example 1 was repeated except that acrylamide was replaced by methacrylamide. Thus a grafted polyester fiber was obtained at a degree of grafting of 15%, with a grafting efficiency of 83%.

EXAMPLE 7

Example 2 was repeated except that acrylamide was replaced by N-t-butylacrylamide. Thus a grafted polyester fiber was obtained at a degree of grafting of 17%, with a grafting efficiency of 70%.

EXAMPLE 8

Example 2 was repeated except that the toluene was replaced by a mixed solvent of n-heptane-tetrachloroethane (8:2). Thus a grafted polyester fiber was obtained at a degree of grafting of 9%, with a grafting efficiency of 75%.

EXAMPLE 9

Example 2 was repeated except that the toluene was replaced by a mixed solvent of xylene-tetrachloroethane (8:2). Thus a grafted polyester fiber was obtained at a degree of grafting of 15%, with a grafting efficiency of 80%.

EXAMPLE 10

One (1) g. of same polyethylene terephthalate fiber employed in Example 1 was placed in a reactor, and to which 10 g. of acrylamide and 200 cc. of benzene were added. After blowing nitrogen gas thereinto, the reactor was closed air-tight, and heated at 90° C. for 4 hours. After cooling the reactor off, the content was thrown into a large amount of methanol. Hardly any precipitation of acrylamide homopolymer was recognized. Weight of the dried fiber was measured to determine the degree of grafting and grafting efficiency. Then the fiber was subjected to an extraction step for 24 hours in warm water of 50° C., followed by an overnight's vacuum-drying at 60° C. Thus dried fiber was again measured of its weight. The degree of grafting was 50%, and grafting efficiency was 95%. The moisture regain of this grafted fiber in standard atmosphere (20° C., relative humidity of 63%) was 7.0%, and water absorption was 41%. Since those values of the starting fiber were 0.25% and 13%, respectively, it was clearly demonstrated that the grafted fiber possessed remarkably improved hydrophilic property.

The grafted fiber was dyed with the cation dyestuff employed in Example 2, under identical conditions. It dyed very well, and resulting color deepness and washing fastness were of the same level attained in Example 2.

EXAMPLE 11

The graft polymerization was effected under identical conditions with those employed in Example 10, except that the grafting reaction was conducted at 90° C. for 1.5 hours, using 100 g. of the starting fiber. Thus obtained degree of grafting was 20%, and the grafting efficiency was 93%. The grafted fiber was knit into a piece of tricot fabric, to be examined of its antistatic property. The electrical resistance was $2 \times 10^8$ ohms at 100 volts. As to its electrification in electrostatic field, the static charge was 3 millivolts, and half value period was one second. Since the tricot knit from the starting fiber had the similarly measured values of, respectively, not less than $2 \times 10^{12}$ ohms, 57 millivolts and not less than 30 seconds, as already mentioned in Example 3, it was confirmed that the grafted fiber had remarkably improved anti-static property. Also as to soil resistance, the grafted fiber showed remarkable improvement.

EXAMPLE 12

Example 10 was repeated except that the benzene was replaced by a mixed solvent of n-heptane and tetrachloroethane (9:1 by volume). Thus a grafted fiber was obtained at a degree of grafting of 60% with a grafting efficiency of 90%.

EXAMPLE 13

Example 10 was repeated except that the benzene was replaced by toluene. Thus a grafted fiber was obtained at a degree of grafting of 45%, with a grafting efficiency of 85%.

EXAMPLE 14

Example 10 was repeated except that the acrylamide was replaced by N-methylolacrylamide. Thus a grafted fiber was obtained at a degree of grafting of 40%, with a grafting efficiency of 88%.

EXAMPLE 15

A polymer obtained by polycondensation of ethylene glycol and terephthalic acid was melt-spun, drawn, and heat-treated to provide a yarn of 250 deniers/48 filaments (7.5 g./dr.). Four strands of this yarn were twisted into a tyre cord, which was subjected to the grafting reaction described in Example 10, except that the grafting temperature was raised to 100° C. Thus an acrylamide-grafted tyre cord was obtained at a degree of grafting of 20%, with a grafting efficiency of 85%. The cord was bonded with rubber by RFL treatment of single stage immersion method. The resulting bonding strength was 7 kg./mm.², when measured by H test method (J. Ryons, Ind. Rubber World, 114, 213 (1946)).

When the same tyre cord without the grafting treatment was bonded with rubber by two-stage immersion process in RFL and isocyanate, the resulting bonding strength was 6.5 kg./mm.², when measured by identical method.

Thus it was confirmed that the acrylamide-grafted polyester tyre cord obtained by the subject process exhibits sufficiently high bonding strength with rubber after single stage RFL immersion only, without the additional treatment with isocyanate.

EXAMPLE 16

Example 10 was repeated except that extra 20 cc. of methyl methacrylate was added to the saturated benzene solution of acrylamide. Thus a polyester fiber to which both acrylamide and methyl methacrylate were grafted was obtained at a degree of grafting of 70%, with a grafting efficiency of 80%.

EXAMPLE 17

Example 12 was repeated except that the acrylamide was replaced by N-t-butylacrylamide. Thus a grafted polyester fiber was obtained at a degree of grafting of 30%, with a grafting efficiency of 80%.

EXAMPLE 18

Example 10 was repeated except that the polyester fiber was replaced by biaxially stretched, 0.1-mm. thick polyester film. Thus an acrylamide-grafted polyester film was obtained at a degree of grafting of 30%, with a grafting efficiency of 96%.

EXAMPLE 19

Five (5) parts of a polyethylene terephthalate co-condensate fiber in which a 3 mol percent of 2,2'-dimethyl-cis, cis-muconic acid to the terephthalic acid component was co-condensed (the monofilament having a size of 1.6 deniers, dry strength of 4.8 g./dr. after drawing and heat treatment) was placed in a reactor containing 25 parts of acrylamide and 475 parts of benzene. Nitrogen gas was passed through the reactor at 70° C. for 20 minutes, to displace the air in the reaction system. The reactor was then closed air-tight, placed in a warm aqueous bath of 90° C., and maintained at 90° C. for 3 hours. Thereafter the reactor was cooled, and the content was thrown into a large amount of methanol. After washing the fiber well with the methanol, the fiber was vacuum-dried overnight at 60° C. The weight of the dry fiber was measured. The fiber was furthermore heated for 10 hours in warm water of 60° C. to extract and remove acrylamide homopolymer therefrom, followed by an overnight's vacuum-drying at 60° C. From the calculation based on the weight increase after the graft polymerization and that after aqueous extraction and drying, the degree of grafting and grafting efficiency were 25% and 82%, respectively. No fiber agglutination was observed.

Thus obtained grafted fiber (sample A) was dyed with a cation dye under the below-identified condition. Also for comparison, a polyethylene terephthalate fiber containing no α,α'-dimethyl-cis, cis-muconic acid as a co-condensing component but containing acrylamide as grafted thereto at a degree of grafting of 25% (sample B) was dyed under identical conditions. The dyed results are given in Table 2 below.

Dyeing conditions:
  Dyestuff: Sevron Brilliant Red B (C.I. Basic Red-15)
  2% (to the material to be dyed)
  Sodium sulfate 10% (to the material to be dyed)
  Acetic acid 0.3% (to the material to be dyed)
  Bath ratio: 50:1
  Bath temperature: 98° C.
  Dyeing time: 120 minutes
Soaping conditions:
  Polyoxyethylene alkyl ether: 1 g./liter
  Bath ratio: 50:1
  Bath temperature: 60° C.
  Soaping time: 30 minutes

TABLE 2

|  | Sample A [1] | Sample B [2] |
|---|---|---|
| Dye on fiber (mg./g.) | 16.4 | 16.0 |
| Color shade ($K/S$) | 6.0 | 5.9 |
| Light fastness [3] (class) | 3 | 1 |

[1] Grafted fiber of α,α-dimethyl-cis, cis-muconic acid co-condensation polymer.
[2] Grafted polyethylene terephthalate fiber.
[3] Employed light source was xenon lamp; measured after soaping, at a relative humidity of 45%, and temperature of 40° C.

A clearly demonstrated from the above results, Sample A showed a light fastness better than that of Sample B by two classes, when dyed with an identical cation dye.

Incidentally, the starting fibers not grafted with acrylamide could not be dyed with cationic dye more than by very slight degree appearing like soiling, regardless if it contained α,α-dimethyl-cis, cis-muconic acid or not.

What is claimed is:

1. A process for the preparation of an amidovinyl compound-grafted shaped material of an aromatic polyester without the need of ionizing radiation or catalyst, which consists essentially of heating a shaped material of an aromatic polyester at a temperature of 60–150° C., while in contact with a solvent containing at least one amidovinyl compound, said solvent being selected from benzene, toluene, tetrahydronaphthalene, ethylacetate, n-heptane, n-hexane, n-octane, and
  n-heptane/tetrachloroethane,
  n-hexane/tetrachloroethane,
  benzene/tetrachloroethane,
  toluene/tetrachloroethane,
  benzene/dioxane,
  water/dioxane, and
  methanol/chloroform mixed systems,
said solvent being one in which the solubility of the amidovinyl compound therein is 0.1–50 g. per 100 cc. at 45° C., and the degree of swelling of the shaped material with the solvent is 0.5–20% at 60° C.

2. The process of claim 1, wherein said shaped material of an aromatic polyester is immersed and swollen in a bath of said solvent containing at least one amidovinyl compound, said bath being maintained at a temperature of 5°–60° C.; withdrawn from the bath; and heated at a temperature of 60°–150° C. while said shaped material still retains 1–20 cc. of the bath per 1 g. of the shaped material.

3. The process of claim 1, wherein said shaped material of an aromatic polyester is immersed in a bath of said solvent containing at least one amidovinyl compound and the system is heated to a temperature of 60°–150° C., the volume of the bath being 20–2,000 cc. per 1 g. of the shaped material.

4. The process of claim 1, wherein the heating temperature for graft-polymerization is 70–120° C.

5. The process of claim 1, wherein the solubility of the amidovinyl compound in the solvent is 0.3–30 g. per 100 cc. at 45° C. and the degree of swelling of said shaped material with said solvent is 3–15 % at 60° C.

6. The process of claim 1 wherein the solvent is benzene.

7. The process of claim 1 wherein the solvent is toluene.

References Cited

UNITED STATES PATENTS

| | | | |
|---|---|---|---|
| 3,034,847 | 5/1962 | Chapman | 8—Tery Dig. |
| 3,083,118 | 3/1963 | Bridgeford | 8—Graft Dig. |
| 3,155,754 | 11/1964 | Adams | 264—78 |
| 3,188,165 | 6/1965 | Magat et al. | 8—Graft |
| 3,313,591 | 4/1967 | Tanner et al. | 8—Graft |
| 3,386,795 | 6/1968 | Caldwell et al. | 264—78 |
| 3,423,481 | 1/1969 | Mizutani | 260—873 |

ROBERT F. WHITE, Primary Examiner

G. AUVILLE, Assistant Examiner

U.S. Cl. X.R.

8—115.5, Dig. 18; 260—73; 264—343